UNITED STATES PATENT OFFICE.

HERMANN HEYDENHAUSS, OF VIENNA, AUSTRIA-HUNGARY.

SUBSTITUTE FOR CELLULOID.

950,392.  Specification of Letters Patent.  Patented Feb. 22, 1910.

No Drawing.  Application filed September 2, 1909. Serial No. 515,922.

*To all whom it may concern:*

Be it known that I, HERMANN HEYDENHAUSS, a subject of the Emperor of Austria-Hungary, residing at I Tuchlauben 8, Vienna, Austria-Hungary, have invented certain new and useful Improvements in Substitutes for Celluloid, of which the following is a specification.

The present invention relates to the manufacture of a substitute for celluloid, and has for its object to provide such a substitute which possesses the transparency and the tenacity of celluloid and can be worked and polished equally as well, but which has the important advantages over celluloid that it is not inflammable, is inodorous, tasteless and does not in any way affect the health of the manufacturer or user.

According to my invention, a mixture of glue, gelatin, or of other animal albumin, and a solution of carrageen moss is treated with acetic acid, or other acid, and alcohol, and the mixture is hardened with formaldehyde or similar hardening agent. The resulting product shows a superior degree of flexibility and capability of better working, when compared with another known celluloid substitute consisting of glue hardened with formaldehyde, or when compared with a product obtained by treating a mixture of glue agar-agar with formaldehyde.

The following is an example of the manner of manufacturing the new product: 25 parts glue or gelatin are mixed in the swelled condition with 10 parts of a saturated solution of carrageen moss, and then ten parts vinegar or dilute acetic acid and 10 parts alcohol are added. The addition of the alcohol prevents the formation of bubbles. The mixture is made with the materials in a warm state. Any coloring material may be added to the mixture, if desired. The mass is thereupon hardened by placing it in a bath consisting of a solution of formaldehyde.

I claim:—

1. As a new article of manufacture, the hereindescribed product resulting from the action of a hardening agent on a mixture consisting of an animal albumin, carrageen moss, an acid, and alcohol.

2. As a new article of manufacture, the hereindescribed product resulting from the action of formaldehyde on a mixture consisting of an animal albumin, carrageen moss, an acid, and alcohol.

3. As a new article of manufacture, the hereindescribed product resulting from the action of formaldehyde on a mixture consisting of gelatin, carrageen moss, acetic acid, and alcohol.

4. A composition of matter, comprising an animal albumin, carrageen moss, an acid, alcohol, and formaldehyde.

5. A composition of matter comprising an animal albumin, carrageen moss, acetic acid, alcohol, and formaldehyde.

6. A composition of matter comprising gelatin, carrageen moss, an acid, alcohol, and formaldehyde.

7. A composition of matter adapted to be used as a substitute for celluloid, comprising gelatin, carrageen moss, acetic acid, alcohol, and formaldehyde.

8. A composition of matter adapted to be used as a substitute for celluloid, comprising the product resulting from the mixture of gelatin, a solution of carrageen moss, solution of acetic acid, and alcohol, and the action thereon of formaldehyde.

9. A composition of matter comprising gelatin, a solution of carrageen moss, a solution of acetic acid, alcohol, and formaldehyde.

10. A composition of matter adapted to be used as a substitute for celluloid, comprising the product resulting from the action of formaldehyde on 25 parts gelatin, 10 parts solution of carrageen moss, 10 parts solution of acetic acid, and 10 parts alcohol.

In testimony whereof I affix my signature in presence of two witnesses.

HERMANN HEYDENHAUSS.

Witnesses:
KARL TRAUNER,
AUGUST FUGGER.